(12) United States Patent
Hüsgen et al.

(10) Patent No.: US 12,251,751 B2
(45) Date of Patent: Mar. 18, 2025

(54) CROSSHEAD FOR USE AS AN UPPER AND/OR LOWER BEAM IN A PRESS

(71) Applicant: SMS group GmbH, Düsseldorf (DE)

(72) Inventors: David Hüsgen, Korschenbroich (DE); Michael Büsch, Viersen (DE); Mohamed Houari, Castrop-Rauxel (DE); Frederik Knauf, Nideggen-Abenden (DE)

(73) Assignee: SMS group GmbH, Düsseldorf (DE)

( * ) Notice: Subject to any disclaimer, the term of this patent is extended or adjusted under 35 U.S.C. 154(b) by 337 days.

(21) Appl. No.: 17/925,690

(22) PCT Filed: May 14, 2021

(86) PCT No.: PCT/EP2021/062817
§ 371 (c)(1),
(2) Date: Dec. 30, 2022

(87) PCT Pub. No.: WO2021/233779
PCT Pub. Date: Nov. 25, 2021

(65) Prior Publication Data
US 2023/0339012 A1    Oct. 26, 2023

(30) Foreign Application Priority Data
May 18, 2020 (DE) .............. 10 2020 206 223.4

(51) Int. Cl.
*B21J 9/02* (2006.01)
*B21J 9/12* (2006.01)
(Continued)

(52) U.S. Cl.
CPC .............. *B21J 9/02* (2013.01); *B21J 13/04* (2013.01)

(58) Field of Classification Search
CPC .. B21J 9/02; B21J 13/04; B30B 15/00; B30B 15/04; B30B 15/041; B30B 15/042; B30B 15/044; B30B 15/045
See application file for complete search history.

(56) References Cited

U.S. PATENT DOCUMENTS

| 3,302,556 A * | 2/1967 | Durbin .................... B30B 15/04 335/302 |
| 2004/0181936 A1 | 9/2004 | Jin et al. |
| 2020/0384540 A1 | 12/2020 | Baensch et al. |

FOREIGN PATENT DOCUMENTS

| CN | 103507291 A * | 1/2014 |
| CN | 103507291 B | 7/2015 |

(Continued)

OTHER PUBLICATIONS

JP_H0994700_A_M.pdf, retrieved date Nov. 13, 2024.*

(Continued)

*Primary Examiner* — Mohammed S. Alawadi
(74) *Attorney, Agent, or Firm* — Smartpat PLC

(57) ABSTRACT

A crosshead (1) for use as an upper and/or lower beam (50, 60) in a press (100), in particular an open-die forging press or a closed-die forging press, comprises an upper chord (2) and a lower chord (5) connected to the upper chord (2) via a first and a second lateral upright (3, 4). The first lateral upright (3) is arranged in the region of a first distal end (6) and the second lateral upright (4) is arranged in the region of a second distal end (7) of the crosshead (1). The crosshead (1) has a truss support structure (8) between the two lateral uprights (3, 4) by which the upper chord (2) and the lower chord (5) are additionally connected to one another.

10 Claims, 5 Drawing Sheets

(51) Int. Cl.
    *B21J 13/04*     (2006.01)
    *B30B 15/04*     (2006.01)
    *F16M 1/00*     (2006.01)

(56) References Cited

FOREIGN PATENT DOCUMENTS

| | | | | |
|---|---|---|---|---|
| CN | 104647799 B | 5/2017 | | |
| DE | 10344635 A1 | 5/2005 | | |
| DE | 102009034267 A1 * | 4/2010 | ............... | B30B 1/34 |
| DE | 102013108299 A1 | 2/2015 | | |
| DE | 102017221126 A1 | 5/2019 | | |
| DE | 202018003840 U1 | 11/2019 | | |
| JP | S5554235 A | 4/1980 | | |
| JP | 2014223651 A | 12/2014 | | |
| JP | 2018089660 A | 6/2018 | | |

OTHER PUBLICATIONS

English translate (DE102009034267A1), retrieved date Nov. 13, 2024.*
English translate (CN103507291A), retrieved date Nov. 13, 2024.*
Ráž, Karel, and Milan Čechura. "Optimization of forming machine stiffness for increased production accuracy." In IOP Conference Series: Materials Science and Engineering, vol. 651, No. 1, p. 012015. IOP Publishing, 2019.
Raz, Karel, Milan Cechura, and Vaclac Kubec. "Unconventional design of the mechanical crank press developed by the topology optimization." Manufacturing Technology 20, No. 3 (Sep. 2020): 368-72.
Raz, Karel, Milan Cechura, and Zdenek Chval. "Upper crossbeam of free forging press optimization in order to improve mechanical properties and durability." Annals of DAAAM for (2015): 524-529.

* cited by examiner

CROSSHEAD FOR USE AS AN UPPER AND/OR LOWER BEAM IN A PRESS

TECHNICAL FIELD

The present disclosure relates to a crosshead for use as an upper and/or lower beam in a press, in particular in an open-die forging press or a closed-die forging press, and to a press, in particular an open-die forging press or a closed-die forging press, comprising the crosshead.

BACKGROUND

Forging press crossheads are components of large design. Due to the enormous press forces of 1 MN to 200 MN to which the crossheads are subjected in a press under load, they are designed in a massive and bulky construction. Therefore, the crossheads known from the prior art usually have a weight of several 100 t.

Since the trend toward larger equipment and machinery continues, castings are now reaching their casting limits when it comes to weight and material usage issues. Furthermore, there are logistical problems associated with such components, since not only their handling but also their transportation is extremely complicated.

A crosshead of massive and bulky construction is known, for example, from DE 10 2013 108 299 A1. The crosshead, designed as an upper beam, is for use in a forging press and comprises an upper chord along with a lower chord connected to the upper chord by first and second lateral uprights made of solid material. Thereby, the upper chord is additionally supported by solid side walls that extend axially between the lateral uprights.

SUMMARY

It is the object of the present disclosure to provide an improved crosshead compared to the prior art along with an improved press, in particular an improved open-die forging press or a closed-die forging press.

This object is achieved with a crosshead or press as claimed.

The crosshead is provided for use as an upper and/or lower beam in a press, in particular an open-die forging press or a closed-die forging press, and comprises an upper chord and a lower chord connected to the upper chord via a first and a second lateral upright, wherein the first lateral upright is arranged in the region of a first distal end and the second lateral upright is arranged in the region of a second distal end of the crosshead.

Between the two lateral uprights the crosshead has a truss support structure by means of which the upper chord and the lower chord are additionally connected to one another. Thereby, the truss support structure in accordance with the invention allows full flexibility in the design between the total weight and the mechanical parameters. In this manner, the total weight can be reduced by up to 20% while maintaining the mechanical parameters, for example stiffness and/or stresses occurring under load. Due to the total weight of several tons, this has an advantageous effect not only on manufacturing costs, but in particular on the transport of such crossheads. Alternatively, if weight reduction is not the primary objective, the mechanical properties can be significantly improved while maintaining the overall weight.

A further advantage is that the truss support structure provides better accessibility to the components mounted in the installed state of the crosshead, such as the press cylinder and/or the adjusting cylinder.

Further advantageous embodiments of the invention are indicated in the dependent formulated claims. The features listed individually in the dependent formulated claims can be combined with one another in a technologically useful manner and can define further embodiments. In addition, the features indicated in the claims are further specified and explained in the description.

Advantageously, the two lateral uprights also have a truss support structure, by means of which a further weight reduction can be achieved.

In a preferred embodiment, the upper chord and the lower chord each have openings that are centrally arranged and in alignment with one another, which define a central region of the crosshead and are provided for connecting the crosshead to a main cylinder of the press. A crosshead designed in this manner is preferably provided for use as an upper beam.

If the crosshead is provided for use as an upper beam, the upper chord and the lower chord preferably each have, on both side of the central opening, a further opening, which are in alignment with one another, for connection to a first and a second press cylinder of the press.

Advantageously, the truss support structure is designed in such a manner that no cylindrical sleeves are required in order to arrange the respective cylinders on the crosshead and fix them to it.

Furthermore, it is preferably provided that the truss support structure comprises a plurality of stiffening ribs arranged around the two central openings, which stiffening ribs connect to one another the upper chord and the lower chord in the central region of the crosshead. The stiffening ribs are primarily used to support the upper chord, which, when subjected to load, experiences deflection by the pressing force of the centrally arranged main cylinder.

In one embodiment, the upper chord of the crosshead, in particular the upper beam, is curved. Since the deflection of an upper chord designed in this manner leads to a higher load on the two distal ends of the upper chord, it is preferable for the stiffening ribs to be designed to be V-shaped in order to counteract such higher load.

In an alternative embodiment, the upper chord of the crosshead, in particular of the upper beam, is flat. Since the deflection of an upper chord designed in this manner does not lead to any higher load on the two distal ends of the upper chord, it is preferable for the stiffening ribs to be designed vertically.

In a particularly advantageous embodiment, the truss support structure comprises a plurality of transversely extending tension ribs that extend from the central region of the lower chord in the direction of the end faces of the upper chord and are fixedly connected to the lateral uprights. Via the tension ribs, the stresses occurring during a forging process can be dissipated in a targeted manner from the stress center outward to the tie rods and then into the lateral uprights of the press.

In this connection, it is particularly advantageously provided that two respective tension ribs arranged parallel to one another are connected to one another via a flat element, which also has an opening that is in alignment with the two press cylinder openings. The additional area thus created between the respective tension ribs enables better force flow and therefore improved dissipation of the stresses occurring during the forging process.

Preferably, the crosshead is manufactured by means of a primary forming process, in particular by means of a casting process. This is particularly advantageous, since it allows highly complex structures to be produced. In an alternative embodiment, the crosshead is manufactured using a 3D printing process.

In another aspect, the present disclosure relates to a press, in particular an open-die forging press or a closed-die forging press, comprising the crosshead in accordance with the disclosure. Such presses are of large design and enable the machining of forged parts with pressing forces of at least 1 MN to 100 MN, more preferably from 8 MN to 200 MN.

The invention and the technical environment are explained in more detail below with reference to the figures. It should be noted that the invention is not meant to be limited by the exemplary embodiments shown. In particular, unless explicitly shown otherwise, it is also possible to extract partial aspects of the facts explained in the figures and combine them with other components and findings from the present description and/or figures. In particular, it should be noted that the figures and in particular the size relationships shown are only schematic. Identical reference signs designate identical objects, such that explanations from other figures can be used as a supplement if necessary.

DETAILED DESCRIPTION

Figure 1:
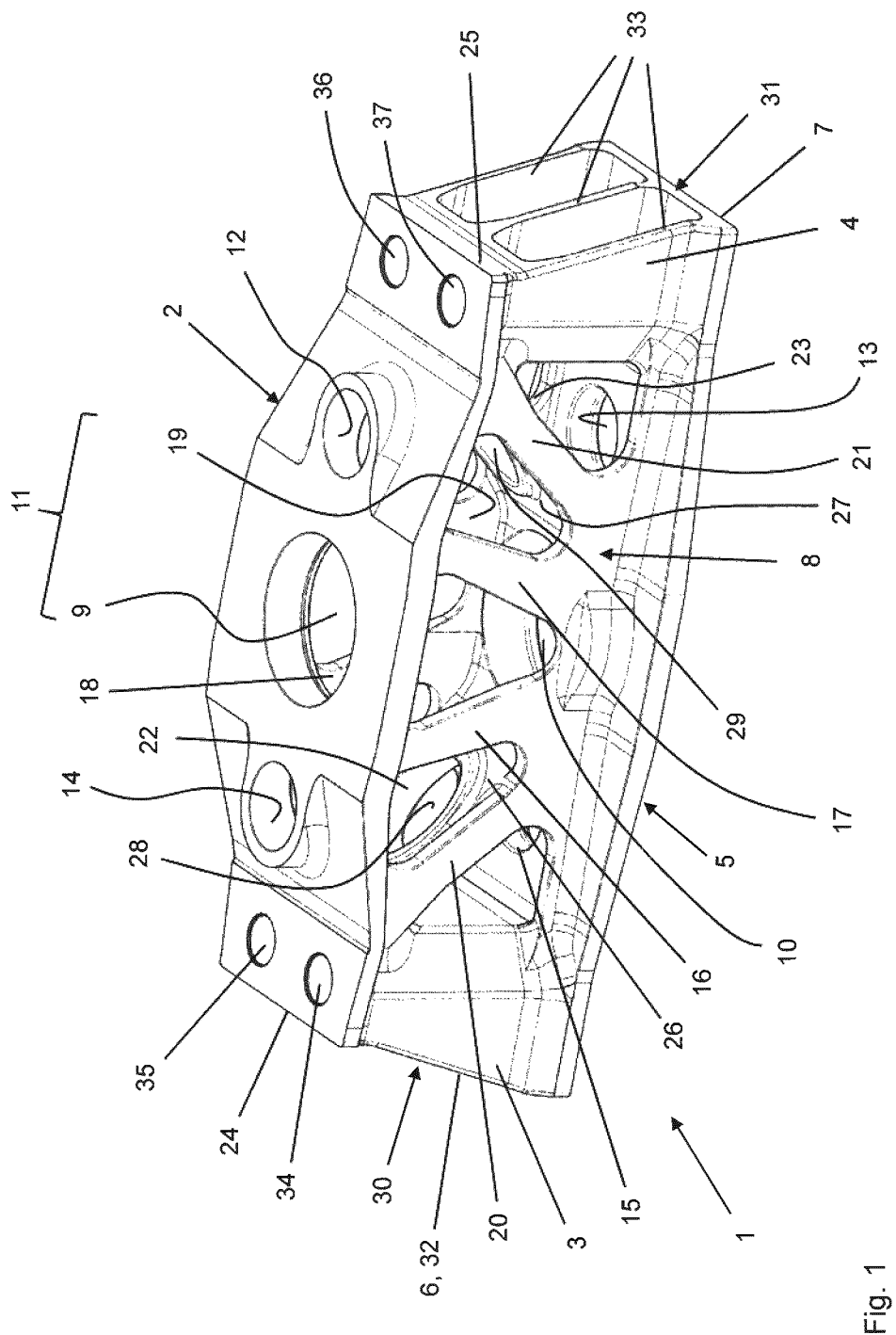
FIG. 1 show a first embodiment of a crosshead in a perspective view.
Figure 5:
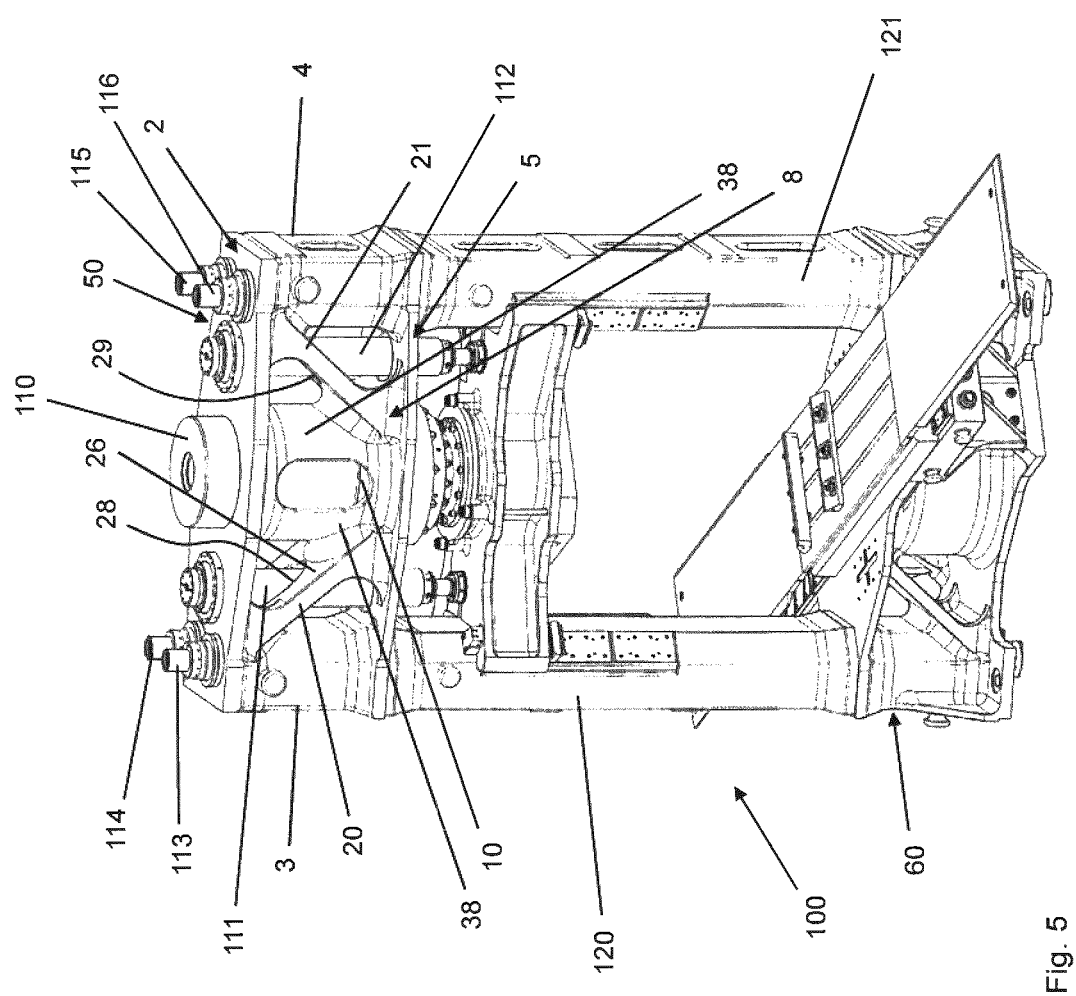
FIG. 5 shows an embodiment of a press with a crosshead in accordance with the second embodiment.

FIG. 1 shows a first embodiment of the crosshead 1 in accordance with the invention, which in the embodiment shown here is provided for use as an upper beam 50 in a press, such as an open-die forging press 100 (see FIG. 5). The crosshead 1 comprises an upper chord 2 and a lower chord 5 connected to the upper chord 2 by a first and second lateral upright 3, 4. The first lateral upright 3 is arranged in the region of a first distal end 6 and the second lateral upright 4 is arranged in the region of a second distal end 7 of the crosshead 1. As can be seen from the illustration in FIG. 1, the crosshead 1 has a truss support structure 8 between the two lateral uprights 3, 4, via which the upper chord 2 and the lower chord 5 are additionally connected to one another.

Figure 2:
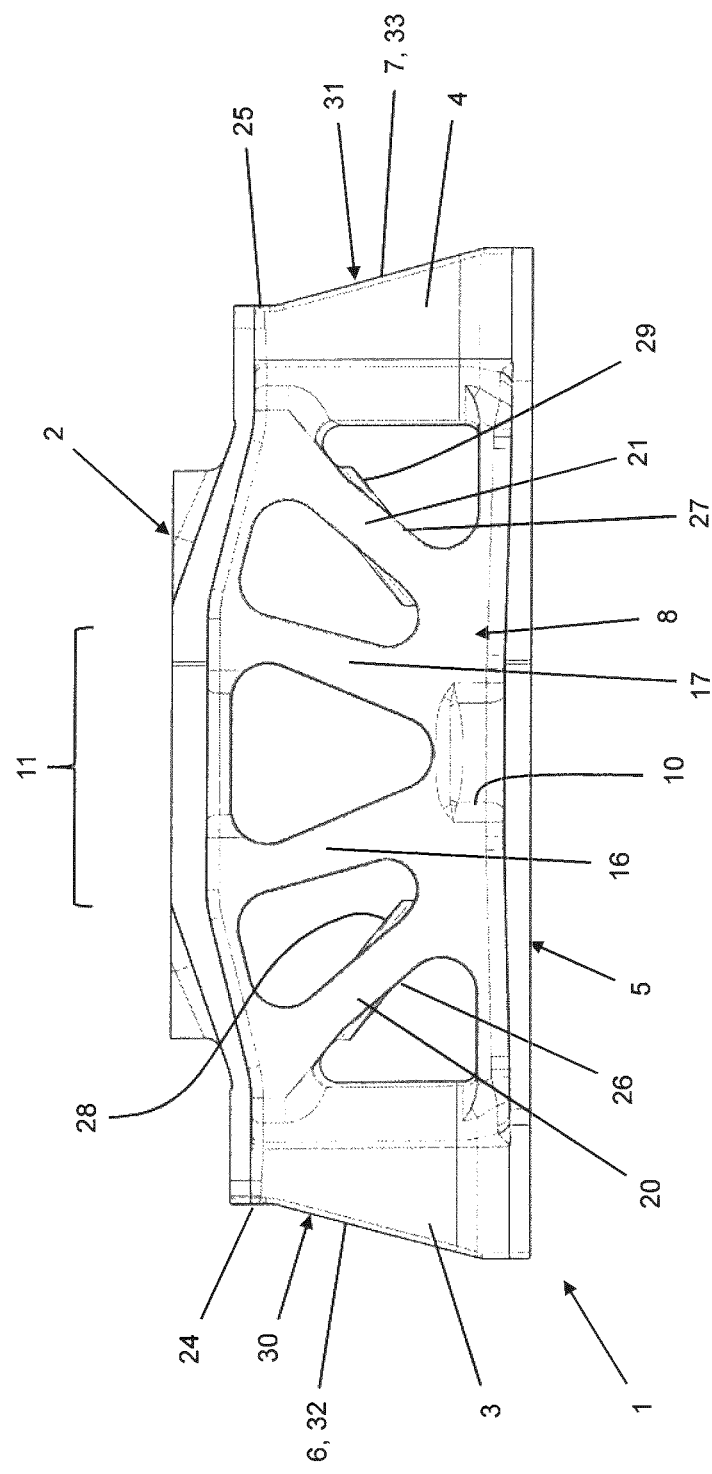
FIG. 2 shows the embodiment in accordance with FIG. 1 in a side view.

For the arrangement of a main cylinder 110, as shown in FIG. 2, both the upper chord 2 and the lower chord 5 have a respective opening 9, 10, which are centrally arranged and in alignment with one another. The region around the centric openings 9, 10 forms a central region 11 of the crosshead 1. On both sides of the two centric openings 9, 10, the upper chord 2 along with the lower chord 5 each comprise a further opening 12, 13, 14, 15 that are alignment with one another, which serve to connect the crosshead 1 in the form of the upper beam 50 to a first and a second press cylinder 111, 112 of the press 100.

In the embodiment shown here, the truss support structure 8 has four stiffening ribs 16, 17, 18, 19 arranged around the two central openings 9, 10, which connect the upper chord 2 and the lower chord 5 in the central region 11 of the crosshead 1. As can be seen from FIG. 1, the upper chord 2 in the embodiment shown is curved, whereas the lower chord 5 is flat. Due to this curved design of the upper chord 2, the stiffening ribs 16, 17 or 18, 19, as the case may be, are each arranged in a V-shape relative to one another.

Furthermore, in the embodiment shown here, the truss support structure 8 comprises four transversely extending tension ribs 20, 21, 22, 23, each of which extends from the central region 11 of the lower chord 5 in the direction of the end faces 24, 25 of the upper chord 2 and is fixedly connected to the respective lateral upright 3, 4. The tension ribs 20, 22 along with 21, 23 are each firmly connected to one another by a flat element 26, 27. Each of the two flat elements 26, 27 also has an opening 28, 29. Thereby, the opening 28 is in alignment with the press cylinder openings 14, 15, whereas the opening 29 is in alignment with the two press cylinder openings 12, 13.

As can also be seen from FIG. 1, in the embodiment shown here, the two lateral uprights 3, 4 also comprise a truss support structure 30, 31, each of which is formed from a plurality of support ribs 32, 33. Via the two lateral uprights 3, 4, the crosshead 1 is connected to lateral uprights 120, 121 of the press 100 by tie rods 113, 114, 115, 116 (FIG. 5), which extend through tie rod openings 34, 35, 36, 37 of the crosshead 1.

FIG. 2 shows the crosshead 1 in accordance with the embodiment shown in FIG. 1, once again in a side view.

Figure 3:
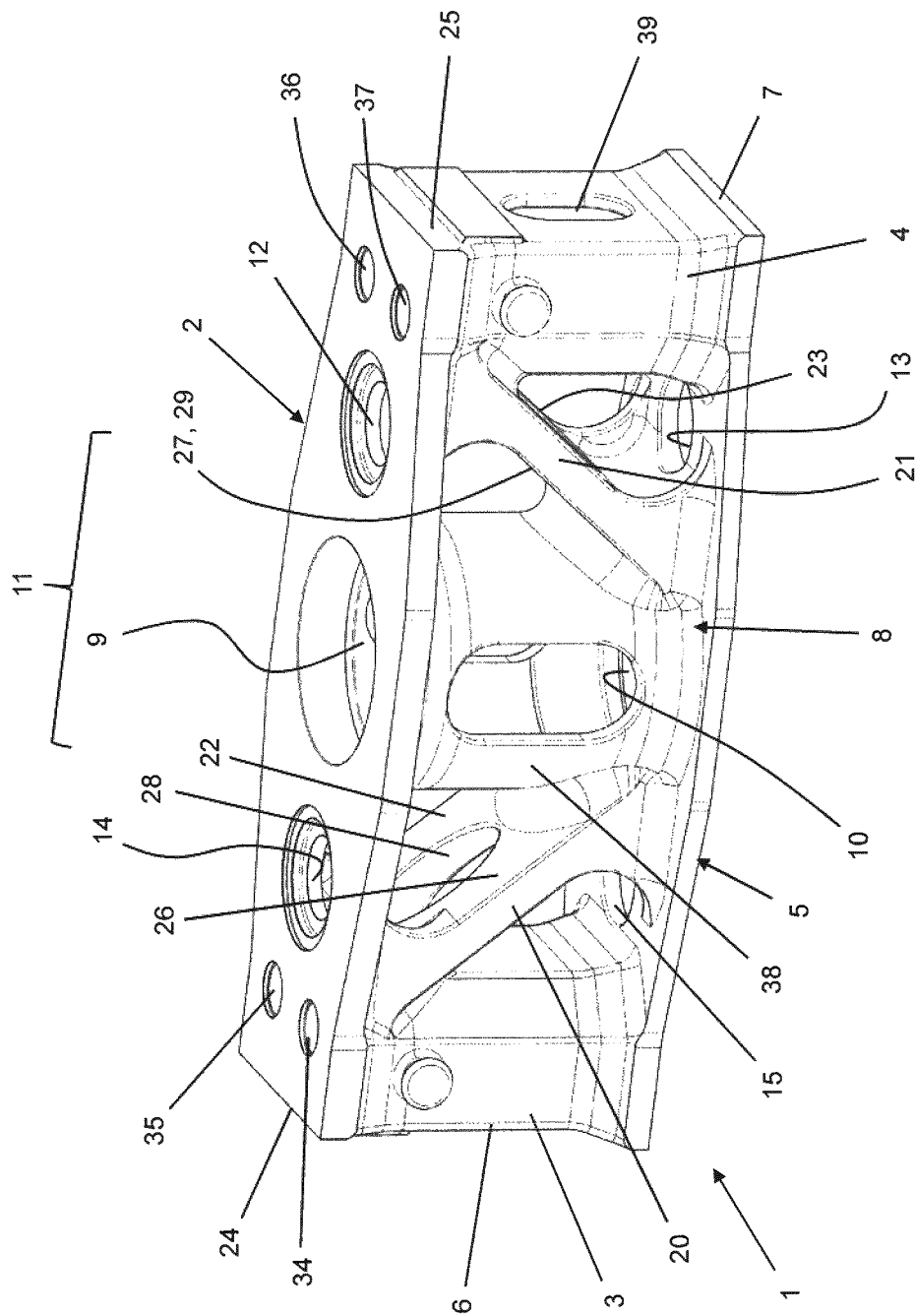
FIG. 3 shows a second embodiment of a crosshead in a perspective view.

FIG. 3 shows a second embodiment of the crosshead 1 in accordance with the invention, which likewise comprises an upper chord 2 and a lower chord 5 connected to the upper chord 2 via a first and a second lateral upright 3, 4.

The first lateral upright 3 is arranged in the region of a first distal end 6 and the second lateral upright 4 is arranged in the region of a second distal end 7 of the crosshead 1. The crosshead 1 shown here also has a truss support structure 8 between the two lateral uprights 3, 4, via which the upper chord 2 and the lower chord 5 are additionally connected to one another.

For the arrangement of a main cylinder 110, as shown in FIG. 5, both the upper chord 2 and the lower chord 5 have a respective opening 9, 10, which are centrally arranged and are in alignment with one another. The region around the centric openings 9, 10 forms a central region 11 of the crosshead 1. On both sides of the two centric openings 9, 10, the upper chord 2 along with the lower chord 5 each comprise a further opening 12, 13, 14, 15 that are alignment with one another, which serve to connect the crosshead 1 in the form of the upper beam 50 to a first and a second press cylinder 111, 112 of the press 100.

In the embodiment shown here, the truss support structure 8 has a plurality of vertically extending stiffening ribs 38 that connect to one another the upper chord 2 and the lower chord 5 in the central region 11 of the crosshead 1. As can be seen from the illustration, the plurality of stiffening ribs 38 are arranged on the circumference of the two central openings 9, 10. In contrast to the embodiment shown in FIGS. 1 and 2, the upper chord 2 is therefore designed to be flat, as is the lower chord 5.

Furthermore, in the embodiment shown here, the truss support structure 8 comprises four transversely extending tension ribs 20, 21, 22, 23, each of which extends from the central region 11 of the lower chord 5 in the direction of the end faces 24, 25 of the upper chord 2 and is fixedly connected to the respective lateral upright 3, 4. The tension ribs 20, 22 along with 21, 23 are also each fixedly connected to one another via a flat element 26, 27, wherein each of the two flat elements 26, 27 additionally has an opening 28, 29. Thereby, the opening 28 is in alignment with the press cylinder openings 14, 15, whereas the opening 29 is in alignment with the two press cylinder openings 12, 13.

As can also be seen from FIG. 3, the two lateral uprights 3, 4 each have a recess 39 in the embodiment shown here. Via the two lateral uprights 3, 4, the crosshead 1 is connected to lateral uprights 120, 121 of the press 100 via tie rods 113, 114, 115, 116 (FIG. 5), which extend through the tie rod openings 34, 35, 36, 37 of the crosshead 1.

Figure 4:
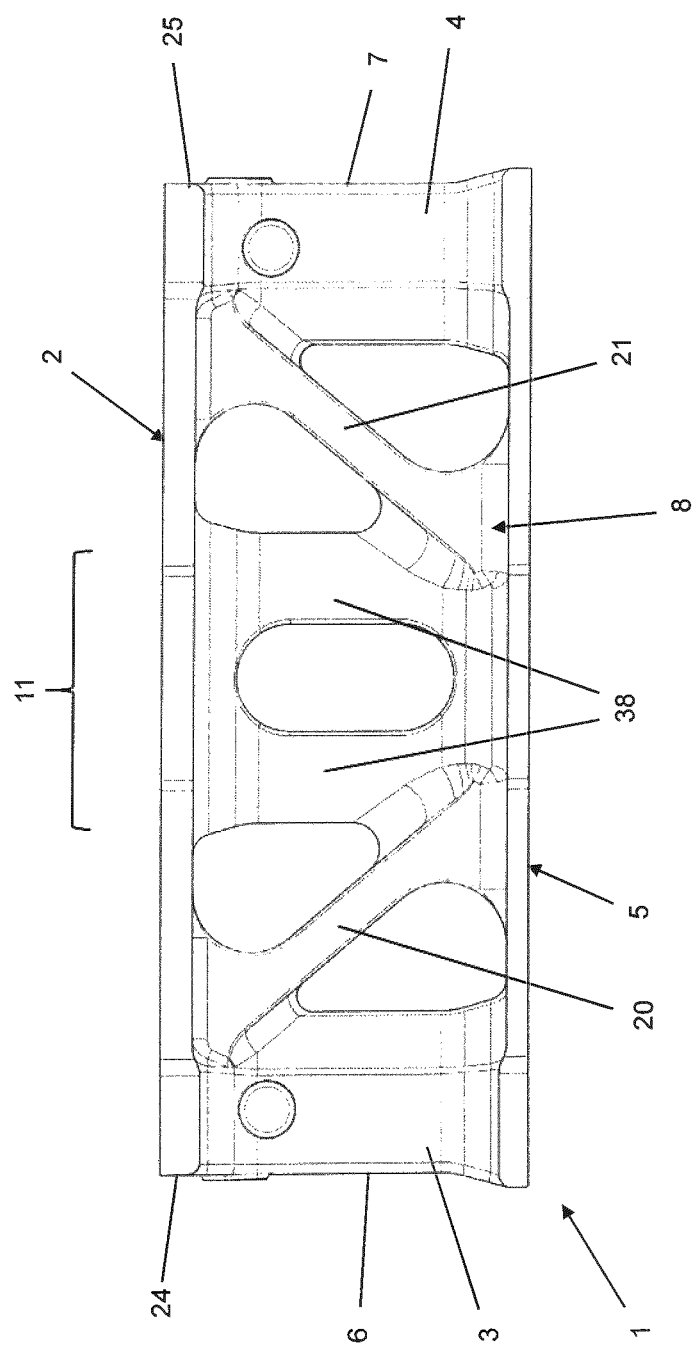
FIG. 4 shows the embodiment in accordance with FIG. 3 in a side view.

FIG. 4 shows the crosshead 1 in accordance with the embodiment shown in FIG. 3, once again in a side view.

FIG. 5 shows an embodiment of a press 100 having an upper beam 50 and a lower beam 60, which is substantially the same as the second embodiment of the crosshead 1. The press 100 shown here is an open-die forging press, as is known from the prior art to a person skilled in the art.

The invention is not limited to the combinations of features defined in the independent claims, but may also be defined by any other combination of particular features of all the individual features disclosed as a whole. This means that, in principle, virtually any individual feature of the independent claims can be omitted or replaced by at least one individual feature disclosed elsewhere in the application. In this respect, the independent claim is to be understood merely as a first attempt at formulating the present invention.

LIST OF REFERENCE SIGNS

1 Crosshead
2 Upper chord
3 Lateral upright
4 Lateral upright
5 Lower chord
6 Distal end
7 Distal end
8 Truss support structure
9 Opening
10 Opening
11 Central region
12 Press cylinder opening
13 Press cylinder opening
14 Press cylinder opening
15 Press cylinder opening
16 Stiffening rib
17 Stiffening rib
18 Stiffening rib
19 Stiffening rib
20 Tension rib
21 Tension rib
22 Tension rib
23 Tension rib
24 End face
25 End face
26 Flat element
27 Flat element
28 Opening
29 Opening
30 Truss support structure
31 Truss support structure
32 Support ribs
33 Support ribs
34 Tie rod opening
35 Tie rod opening
36 Tie rod opening
37 Tie rod opening
38 Stiffening ribs
39 Recess
50 Upper beam
60 Lower beam
100 Press
110 Main cylinder
111 Press cylinder
112 Press cylinder
113 Tie rod
114 Tie rod
115 Tie rod
116 Tie rod
120 Lateral upright
121 Lateral upright

The invention claimed is:

1. A crosshead (1) for use as an upper or lower beam (50, 60) in a press (100), comprising:
   an upper chord (2);
   a lower chord (5), the lower chord (5) being connected to the upper chord (2) via two lateral uprights (3, 4), including
      a first lateral upright (3) and
      a second lateral upright (4),
   wherein the first lateral upright (3) is arranged in a region of a first distal end (6) of the crosshead (1),
   wherein the second lateral upright (4) is arranged in a region of a second distal end (7) of the crosshead (1),
   wherein the crosshead (1) has a truss support structure (8) between the two lateral uprights (3, 4) by which the upper chord (2) and the lower chord (5) are connected to one another,
   wherein each of the upper chord (2) and the lower chord (5) has a central opening (9, 10), the central openings (9, 10) being centrally arranged and in alignment with one another,
   wherein the central openings (9, 10) define a central region (11) of the crosshead (1), and the central openings (9, 10) are provided for connection to a main cylinder (110) of the press (100),
   wherein each of the upper chord (2) and the lower chord (5) comprises, on both sides of the respective central opening (9, 10), respective further openings (12, 13, 14, 15) which are pairwise in alignment with one another, for connection to a first and a second press cylinder (111, 112) of the press (100),
   wherein the truss support structure (8) comprises a plurality of transversely extending tension ribs (20, 21, 22, 23) that extend from the central region (11) of the lower chord (5) towards end faces of the upper chord (24, 25) and are fixedly connected to the lateral uprights (3, 4),
   wherein two respective tension ribs of the plurality of transversely extending tension ribs (20, 21, 22, 23) arranged parallel to one another are each connected to one another via a flat element (26, 27), and
   wherein each of the flat elements (26, 27) has an opening (28, 29) that is in alignment with a pair of the further openings (12, 13, 14, 15).

2. The crosshead (1) according to claim 1, wherein the first and second lateral uprights (3, 4) comprise a further truss support structure (30, 31).

3. The crosshead (1) according to claim 1,
   wherein the truss support structure (8) comprises a plurality of stiffening ribs (16, 17, 18, 19, 38) arranged around the central openings (9, 10), and
   wherein the stiffening ribs connect to one another the upper chord (2) and the lower chord (5) in the central region (11) of the crosshead (1).

4. The crosshead (1) according to claim 3,
wherein the upper chord (2) is curved and the plurality of stiffening ribs (16, 17, 18, 19) arranged around the central openings (9, 10) are arranged in a V-shape.

5. The crosshead (1) according to claim 3,
wherein the upper chord (2) is flat and the plurality of stiffening ribs (38) arranged around the central openings (9, 10) are arranged vertically.

6. The crosshead (1) according to claim 1,
wherein the crosshead (1) is manufactured by a primary forming process.

7. The crosshead (1) according to claim 1,
wherein the crosshead (1) is manufactured by a casting process.

8. The crosshead (1) according to claim 1,
wherein the crosshead (1) is manufactured by a 3D printing process.

9. A press (100), comprising at least one crosshead (1) forming an upper or lower beam (50, 60) thereof, the at least one crosshead (1) comprising:
an upper chord (2);
a lower chord (5), the lower chord (5) being connected to the upper chord (2) via
two lateral uprights (3, 4), including
a first lateral upright (3) and
a second lateral upright (4),
wherein the first lateral upright (3) is arranged in a region of a first distal end (6) of the crosshead (1),
wherein the second lateral upright (4) is arranged in a region of a second distal end (7) of the crosshead (1),
wherein the crosshead (1) has a truss support structure (8) between the two lateral uprights (3, 4) by which the upper chord (2) and the lower chord (5) are connected to one another,
wherein each of the upper chord (2) and the lower chord (5) has a central opening (9, 10), the central openings (9, 10) being centrally arranged and in alignment with one another,
wherein the central openings (9, 10) define a central region (11) of the crosshead (1), and the central openings (9, 10) are provided for connection to a main cylinder (110) of the press (100),
wherein each of the upper chord (2) and the lower chord (5) comprises, on both sides of the respective central opening (9, 10), respective further openings (12, 13, 14, 15) which are pairwise in alignment with one another, for connection to a first and a second press cylinder (111, 112) of the press (100),
wherein the truss support structure (8) comprises a plurality of transversely extending tension ribs (20, 21, 22, 23) that extend from the central region (11) of the lower chord (5) towards end faces of the upper chord (24, 25) and are fixedly connected to the lateral uprights (3, 4),
wherein two respective tension ribs of the plurality of transversely extending tension ribs (20, 21, 22, 23) arranged parallel to one another are each connected to one another via a flat element (26, 27), and
wherein each of the flat elements (26, 27) has an opening (28, 29) that is in alignment with a pair of the further openings (12, 13, 14, 15).

10. An open-die forging press or a closed-die forging press, comprising at least one crosshead (1) having
an upper chord (2);
a lower chord (5), the lower chord (5) being connected to the upper chord (2) via
two lateral uprights (3, 4), including
a first lateral upright (3) and
a second lateral upright (4),
wherein the first lateral upright (3) is arranged in a region of a first distal end (6) of the crosshead (1),
wherein the second lateral upright (4) is arranged in a region of a second distal end (7) of the crosshead (1),
wherein the crosshead (1) has a truss support structure (8) between the two lateral uprights (3, 4) by which the upper chord (2) and the lower chord (5) are connected to one another,
wherein each of the upper chord (2) and the lower chord (5) has a central opening (9, 10), the central openings (9, 10) being centrally arranged and in alignment with one another,
wherein the central openings (9, 10) define a central region (11) of the crosshead (1), and the central openings (9, 10) are provided for connection to a main cylinder (110) of the press (100),
wherein each of the upper chord (2) and the lower chord (5) comprises, on both sides of the respective central opening (9, 10), respective further openings (12, 13, 14, 15) which are pairwise in alignment with one another, for connection to a first and a second press cylinder (111, 112) of the press (100),
wherein the truss support structure (8) comprises a plurality of transversely extending tension ribs (20, 21, 22, 23) that extend from the central region (11) of the lower chord (5) towards end faces of the upper chord (24, 25) and are fixedly connected to the lateral uprights (3, 4),
wherein two respective tension ribs of the plurality of transversely extending tension ribs (20, 21, 22, 23) arranged parallel to one another are each connected to one another via a flat element (26, 27), and
wherein each of the flat elements (26, 27) has an opening (28, 29) that is in alignment with a pair of the further openings (12, 13, 14, 15).

* * * * *